United States Patent
Raj et al.

(10) Patent No.: US 12,040,942 B2
(45) Date of Patent: Jul. 16, 2024

(54) DESIRED STATE MANAGEMENT OF SOFTWARE-DEFINED DATA CENTER

(71) Applicant: VMware, Inc., Palo Alto, CA (US)

(72) Inventors: Saurabh Raj, Bangalore (IN); Pinaki Sankar Kabiraj, Bangalore (IN); Ivaylo Radoslavov Radev, Sofia (BG); Praveen Tirumanyam, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/338,580

(22) Filed: Jun. 21, 2023

(65) Prior Publication Data

US 2023/0336419 A1 Oct. 19, 2023

Related U.S. Application Data

(63) Continuation of application No. 17/665,602, filed on Feb. 7, 2022, now Pat. No. 11,722,372.

(30) Foreign Application Priority Data

Dec. 14, 2021 (IN) .............................. 202141058139

(51) Int. Cl.
*G06F 11/00* (2006.01)
*H04L 41/084* (2022.01)
*H04L 41/0869* (2022.01)
*H04L 67/1095* (2022.01)

(52) U.S. Cl.
CPC ...... *H04L 41/0846* (2013.01); *H04L 41/0869* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 8,856,319 B1 | 10/2014 | Huang et al. | |
| 2009/0083342 A1 | 3/2009 | Tomic et al. | |
| 2011/0225275 A1 | 9/2011 | Shah et al. | |
| 2014/0173065 A1 | 6/2014 | Sears | |
| 2017/0161057 A1* | 6/2017 | Khazanchi | G06F 8/70 |
| 2017/0255874 A1* | 9/2017 | Chafle | G06N 20/10 |
| 2017/0300523 A1* | 10/2017 | Ahmed | G06F 16/2358 |
| 2017/0364345 A1 | 12/2017 | Fontoura et al. | |
| 2018/0062917 A1* | 3/2018 | Chandrashekhar | H04L 41/0806 |

(Continued)

FOREIGN PATENT DOCUMENTS

CN 108259543 A 7/2018

OTHER PUBLICATIONS

International Search Report and Written Opinion mailed Mar. 13, 2023 in International Application No. PCT/US2022/050628, 16 pages.

*Primary Examiner* — Christopher B Robinson
(74) *Attorney, Agent, or Firm* — Kim & Stewart LLP

(57) ABSTRACT

A method of managing configurations of a data center according to a desired state of the configurations includes retrieving a running state of the configurations, comparing the running state against a first desired state of the configurations and determining a drift of the running state from the first desired state, notifying a cloud control plane of the drift, and in response to an instruction issued by the cloud control plane to apply the desired state, configuring the data center according to a second desired state.

20 Claims, 6 Drawing Sheets

(56) References Cited

U.S. PATENT DOCUMENTS

| | | |
|---|---|---|
| 2019/0372844 A1 | 12/2019 | Moats et al. |
| 2020/0065166 A1 | 2/2020 | Myneni et al. |
| 2020/0073656 A1* | 3/2020 | Satapathy ................. G06F 8/71 |
| 2020/0204489 A1 | 6/2020 | Pianigiani et al. |
| 2021/0133632 A1* | 5/2021 | Elprin .................... G06N 20/10 |
| 2021/0224133 A1* | 7/2021 | Barsalou ............. G06F 3/04847 |
| 2021/0311760 A1 | 10/2021 | Oki et al. |
| 2023/0030000 A1 | 2/2023 | Sinha et al. |

* cited by examiner

DESIRED STATE MANAGEMENT OF SOFTWARE-DEFINED DATA CENTER

RELATED APPLICATION

This application is a continuation of U.S. patent application Ser. No. 17/665,602, filed Feb. 7, 2022, which claims benefit under 35 U.S.C. 119(a)-(d) to Foreign Application Serial No. 202141058139 filed in India entitled "DESIRED STATE MANAGEMENT OF SOFTWARE-DEFINED DATA CENTER", on Dec. 14, 2021, by VMware, Inc., which is herein incorporated in its entirety by reference for all purposes.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers.

As described in U.S. patent application Ser. No. 17/464,733, filed on Sep. 2, 2021, the entire contents of which are incorporated by reference herein, the desired state of the SDDC, which specifies the configuration of the SDDC (e.g., number of clusters, hosts that each cluster would manage, and whether or not certain features, such as distributed resource scheduling, high availability, and workload control plane, are enabled), may be defined in a declarative document, and the SDDC is deployed or upgraded according to the desired state defined in the declarative document.

The declarative approach has simplified the deployment and upgrading of the SDDC configuration, but may still be insufficient by itself to meet the needs of customers who have multiple SDDCs deployed across different geographical regions, and deployed in a hybrid manner, e.g., on-premise, in a public cloud, or as a service. These customers want to ensure that all of their SDDCs are compliant with company policies, and are looking for an easier way to monitor their SDDCs for compliance with the company policies and manage the upgrade and remediation of such SDDCs.

SUMMARY

A method of managing configurations of a data center according to a desired state of the configurations includes retrieving a running state of the configurations, comparing the running state against a first desired state of the configurations and determining a drift of the running state from the first desired state, notifying a cloud control plane of the drift, and in response to an instruction issued by the cloud control plane to apply the desired state, configuring the data center according to a second desired state.

Further embodiments include a non-transitory computer-readable storage medium comprising instructions that cause a computer system to carry out the above method, as well as a computer system configured to carry out the above method.

DETAILED DESCRIPTION

One or more embodiments employ a cloud control plane for managing the configuration of SDDCs, which may be of different types and which may be deployed across different geographical regions, according to a desired state of the SDDC defined in a declarative document referred to herein as a desired state document. In the embodiment illustrated herein, the desired state document is created in the form of a human readable and editable file, e.g., a JSON (JavaScript Object Notation) file. The cloud control plane is responsible for generating the desired state and specifying configuration operations to be carried out in the SDDCs according to the desired state. Thereafter, configuration agents running locally in the SDDCs establish cloud inbound connections with the cloud control plane to acquire the desired state and the configuration operations to be carried out, and delegate the execution of these configuration operations to services running in a local SDDC control plane.

Figure 1:
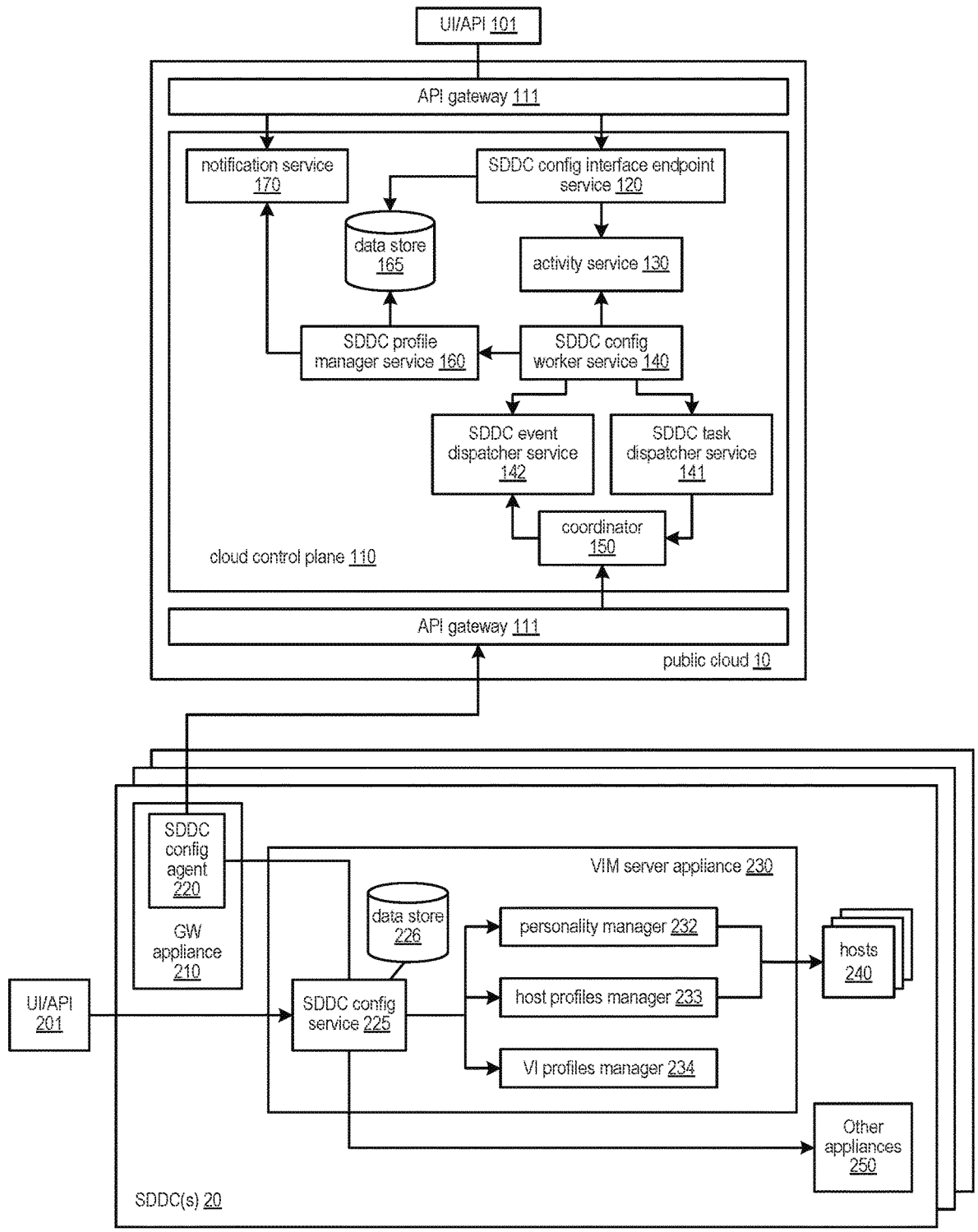
FIG. 1 depicts a cloud control plane implemented in a public cloud, and a plurality of SDDCs that are managed through the cloud control plane, according to embodiments.

FIG. 1 depicts a cloud control plane 110 implemented in a public cloud 10, and a plurality of SDDCs 20 that are managed through cloud control plane 110. In the embodiment illustrated herein, cloud control plane 110 is accessible by multiple tenants through UI/API 101 and each of the different tenants manage a group of SDDCs through cloud control plane 110 according to a desired state of the SDDCs that the tenant defines in a desired state document. In the following description, a group of SDDCs of one particular tenant is depicted as SDDCs 20, and to simplify the description, the operation of cloud control plane 110 will be described with respect to management of SDDCs 20. However, it should be understood that the SDDCs of other tenants have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue commands to: (1) get the desired state or the running state of any of SDDCs 20; (2) create the desired state of SDDCs 20, e.g., by specifying a location of the desired state document or specifying the running state of one of SDDCs 20 to be used as the desired state of all SDDCs 20; (3) perform a compliance check of SDDCs against the desired state; and (4) apply the desired state to SDDCs 20.

Cloud control plane 110 represents a group of services running in virtual infrastructure of public cloud 10 that interact with each other to provide a control plane through which the administrator of SDDCs 20 can manage the desired state of SDDCs 20 by issuing commands through UI/API 101. API gateway 111 is also a service running in the virtual infrastructure of public cloud 10 and this service is responsible for routing cloud inbound connections to the proper service in cloud control plane 110, e.g., SDDC configuration interface endpoint service 120, notification service 170, or coordinator 150.

SDDC configuration interface endpoint service 120 is responsible for accepting commands made through UI/API 101 and returning the result to UI/API 101. An operation requested in the commands can be either synchronous or asynchronous. Asynchronous operations are stored in activity service 130, which keeps track of the progress of the operation, and an activity ID, which can be used to poll for the result of the operation, is returned to UI/API 101. If the operation targets multiple SDDCs 20 (e.g., an operation to apply the desired state to SDDCs 20), SDDC configuration interface endpoint service 120 creates an activity which has children activities. SDDC configuration worker service 140 processes these children activities independently and respectively for multiple SDDCs 20, and activity service 130 tracks these children activities according to results returned by SDDC configuration worker service 140.

SDDC configuration worker service 140 polls activity service 130 for new operations and processes them by passing the tasks to be executed to SDDC task dispatcher service 141. SDDC configuration worker service 140 then polls SDDC task dispatcher service 141 for results and notifies activity service 130 of the results. SDDC configuration worker service 140 also polls SDDC event dispatcher service 142 for events posted to SDDC event dispatcher service 142 and handles these events based on the event type. Examples of events posted to SDDC event dispatcher service 142 include a change event, where "a local change has been made to the desired state of an SDDC" and a drift event, where "the running state of SDDC is out of compliance with its desired state."

SDDC task dispatcher service 141 dispatches each task passed thereto by SDDC configuration worker service 140, to coordinator 150 and tracks the progress of the task by polling coordinator 150. Coordinator 150 accepts cloud inbound connections, which are routed through API gateway 111, from SDDC configuration agents 220. SDDC configuration agents 220 are responsible for establishing cloud inbound connections with coordinator 150 to acquire tasks dispatched to coordinator 150 for execution in their respective SDDCs 20, and orchestrating the execution of these tasks. Upon completion of the tasks, SDDC configuration agents 220 return results to coordinator 150 through the cloud inbound connections. SDDC configuration agents 220 also notify coordinator 150 of various events through the cloud inbound connections, and coordinator 150 in turn posts these events to SDDC event dispatcher service 142 for handling by SDDC configuration worker service 140.

SDDC profile manager service 160 is responsible for storing the desired state documents in data store 165 (e.g., a virtual disk or a depot accessible using a URL) and, for each of SDDCs 20, tracks the history of the desired state document associated therewith and any changes from its desired state specified in the desired state document, e.g., using a relational database (hereinafter referred to as "desired state tracking database").

Figure 2:
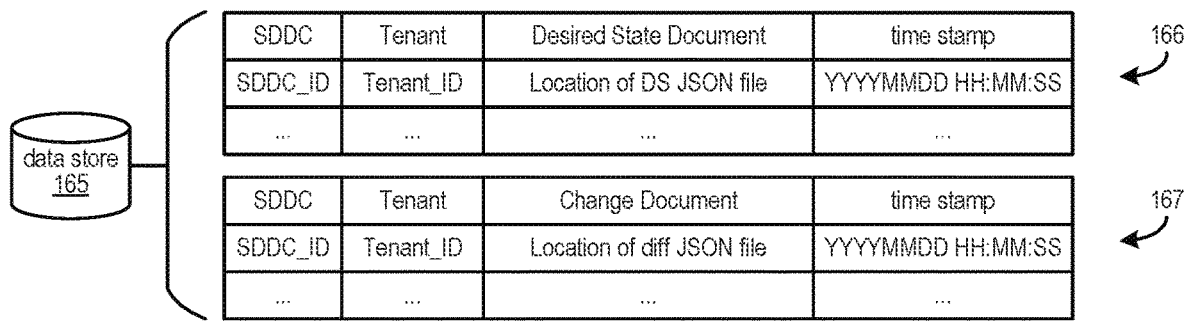
FIG. 2 illustrates tables used in tracking the desired state applied to SDDCs and changes to the desired state.

FIG. 2 illustrates two tables, tables 166 and 167, of the desired state tracking database that are used to track the history. Each time a desired state is applied to an SDDC, an entry is added to table 166. The entry added to table 166 identifies the SDDC using its ID (SDDC_ID), the tenant for whom the SDDC is deployed (Tenant_ID), the location where the desired state document (DS JSON file) is stored, and a time stamp indicating the date (YYYYMMDD) and time (HH:MM:SS) the desired state is applied to the SDDC. Similarly, each time a change from the desired state is detected, an entry is added to table 167. The entry added to table 167 identifies the SDDC using its ID (SDDC_ID), the tenant for whom the SDDC is deployed (Tenant_ID), the location where a change document that contains the differences from the desired state (diff JSON file) is stored, and a time stamp indicating the date (YYYYMMDD) and time (HH:MM:SS) the change was detected.

When SDDC configuration worker service 140 processes children activities associated with an operation to apply the desired state to SDDCs 20, SDDC configuration worker service 140 calls SDDC profile manager service 160 to store the desired state document in data store 165 and to update the desired state tracking database to record what (e.g., which desired state document) is being applied to where (e.g., to which SDDC) and when (e.g., date and time). Similarly, when SDDC configuration agent 220 of an SDDC notifies coordinator 150 of a change event or a drift event, and coordinator 150 posts the change or drift event to SDDC event dispatcher service 142, SDDC configuration worker service 140 calls SDDC profile manager service 160 to update the desired state tracking database to record what (e.g., which desired state document of which SDDC) has changed and when (e.g., date and time). Thereafter, SDDC profile manager service 160 posts notifications about any changes made to the desired state tracking database to notification service 170, and the administrator can get such notifications through UI/API 101.

An operation requested in the commands made through UI/API 101 may be synchronous, instead of asynchronous. An operation is synchronous if there is a specific time window within which the operation must be completed. Examples of a synchronous operation include an operation to get the desired state of an SDDC or an operation to get SDDCs that are associated with a particular desired state. In the embodiments, to enable such operations to be completed within the specific time window, SDDC configuration interface endpoint service 120 has direct access to data store 165.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above (and below) may be a microservice that is implemented as a container image executed on the virtual infrastructure of public cloud 10. In one embodiment, each of the services described above is implemented as one or more container images running within a Kubernetes® pod.

In each SDDC 20, regardless of its type and location, a gateway appliance 210 and virtual infrastructure management (VIM) appliance 230 are provisioned from the virtual resources of SDDC 20. Gateway appliance 210 is able to establish connections with cloud control plane 110 and a local control plane of SDDC 20. In particular, SDDC configuration agent 220 running in gateway appliance 210 communicates with coordinator 150 to retrieve the tasks (e.g., various SDDC configuration actions, such as check compliance against desired state and apply desired state) that were dispatched to coordinator 150 for execution in SDDC 20 and delegates the tasks to SDDC configuration service 225 running in VIM server appliance 230. After the execution of these tasks have completed, SDDC configuration agent 220 sends back the execution result to coordinator 150.

SDDC configuration service 225 is responsible for passing on the tasks delegated by SDDC configuration agent 220 to the local control plane of SDDC 20, which includes: (1) a personality manager 232, which is responsible for applying the desired image of the virtualization software to a cluster of hosts 240 according to the desired state; (2) host profiles manager 233, which is responsible for applying the desired configurations of the cluster of hosts 240 according to the desired state; (3) virtual infrastructure (VI) profiles manager 234, which is responsible for applying the desired configuration of the virtual infrastructure managed by VIM server appliance 230 (e.g., the number of clusters, the hosts that each cluster would manage, etc.) and the desired configuration of various features provided by software services running in VIM server appliance 230 (e.g., distributed resource scheduling (DRS), high availability (HA), and workload control plane), according to the desired state; and (4) plug-ins installed in other appliances 250 (e.g., an appliance that hosts the network virtualization software product), which are responsible for applying the desired configurations of the software running in these other appliances 250 and the virtual infrastructure managed by these other appliances 250, according to the desired state.

Figure 3:
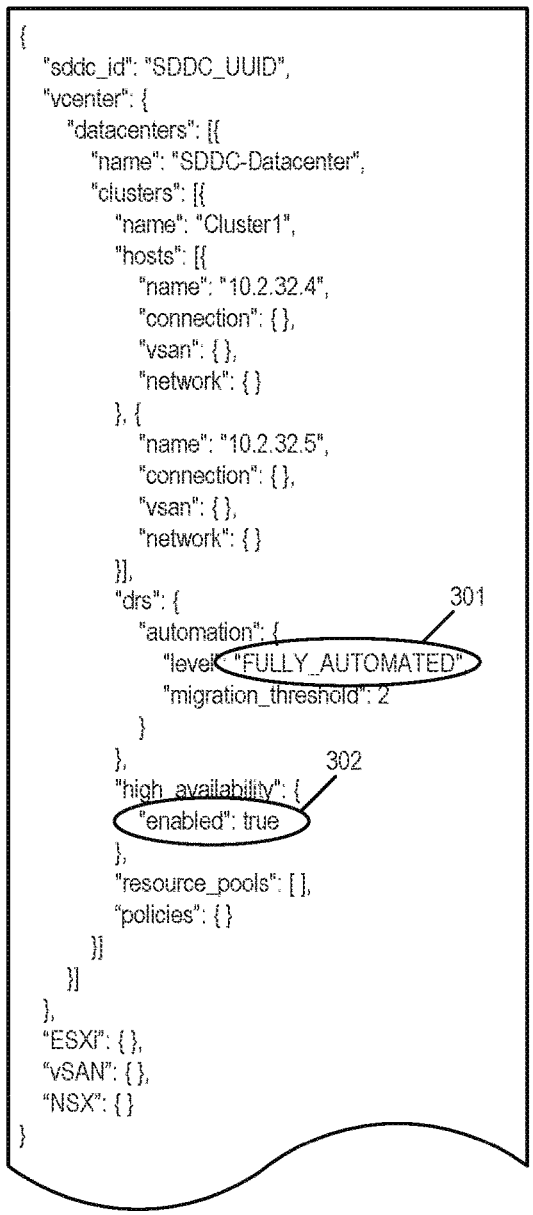
FIG. 3 illustrates a condensed version of a sample desired state document.

The desired state is defined in a desired state document stored locally in data store 226 (e.g., virtual disk) and the desired state document is retrieved from coordinator 150 along with specific tasks (e.g., a task to apply the desired state) that are delegated to SDDC configuration service 225. FIG. 3 illustrates a condensed version of a sample desired state document in JSON format.

The desired state document may be changed by the administrator of SDDCs 20 through UI/API 201. If the desired state is changed by the administrator of SDDCs 20 through UI/API 201, a change document that contains the changes to the desired state document stored in data store 226 is created and stored locally in data store 226. Thereafter, SDDC configuration agent 220 sends the change document to coordinator 150 along with a notification of this change event, i.e., that "a local change has been made to the desired state of an SDDC." Subsequently, the changed desired state may be accepted as the desired state of SDDCs 20 or rejected either manually by the administrator or automatically according to predefined rules of the tenant associated with SDDCs 20.

SDDC configuration service 225 performs a compliance check of the running state of SDDC 20 against the desired state, both periodically and in response to a "compliance check" task that SDDC configuration agent 220 retrieves from coordinator 150 and delegates to SDDC configuration service 225. If a drift of the running state of SDDC 20 from the desired state is detected as a result of this compliance check, SDDC configuration service 225 creates a change document that contains the differences in the running state of SDDC 20 from the desired state document stored in data store 226 and stores the change document locally in data store 226. Thereafter, SDDC configuration agent 220 sends the change document to coordinator 150 along with a notification of this drift event, i.e., that "the running state of SDDC is out of compliance with its desired state."

Figure 4:
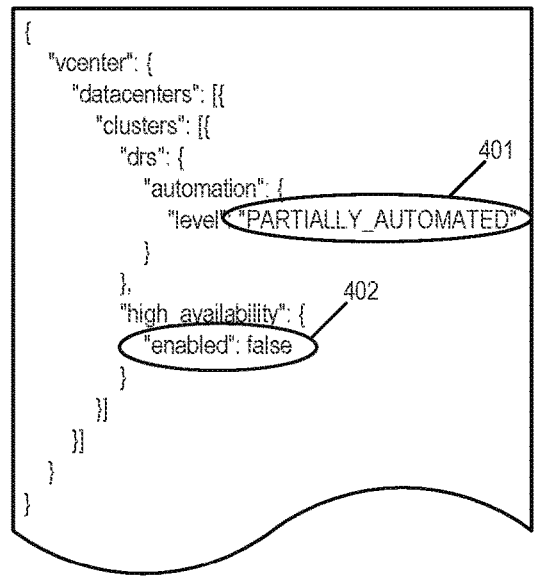
FIG. 4 illustrates a condensed version of a sample change document.

FIG. 4 illustrates a condensed version of a sample change document in JSON format. The change document depicted in FIG. 4 includes changes from the desired state document that resulted from a change made by the administrator of SDDCs 20 through UI/API 201 or from drift that was detected during compliance check. In the sample change document of FIG. 4, changes to two configurations are depicted. The first is a change to the DRS service configuration from "FULLY AUTOMATED" automation level 301 to "PARTIALLY AUTOMATED" automation level 401. The second is a change to the HA service configuration from enabled ("enabled": true) 302 to non-enabled ("enabled": false) 402.

Figure 5:
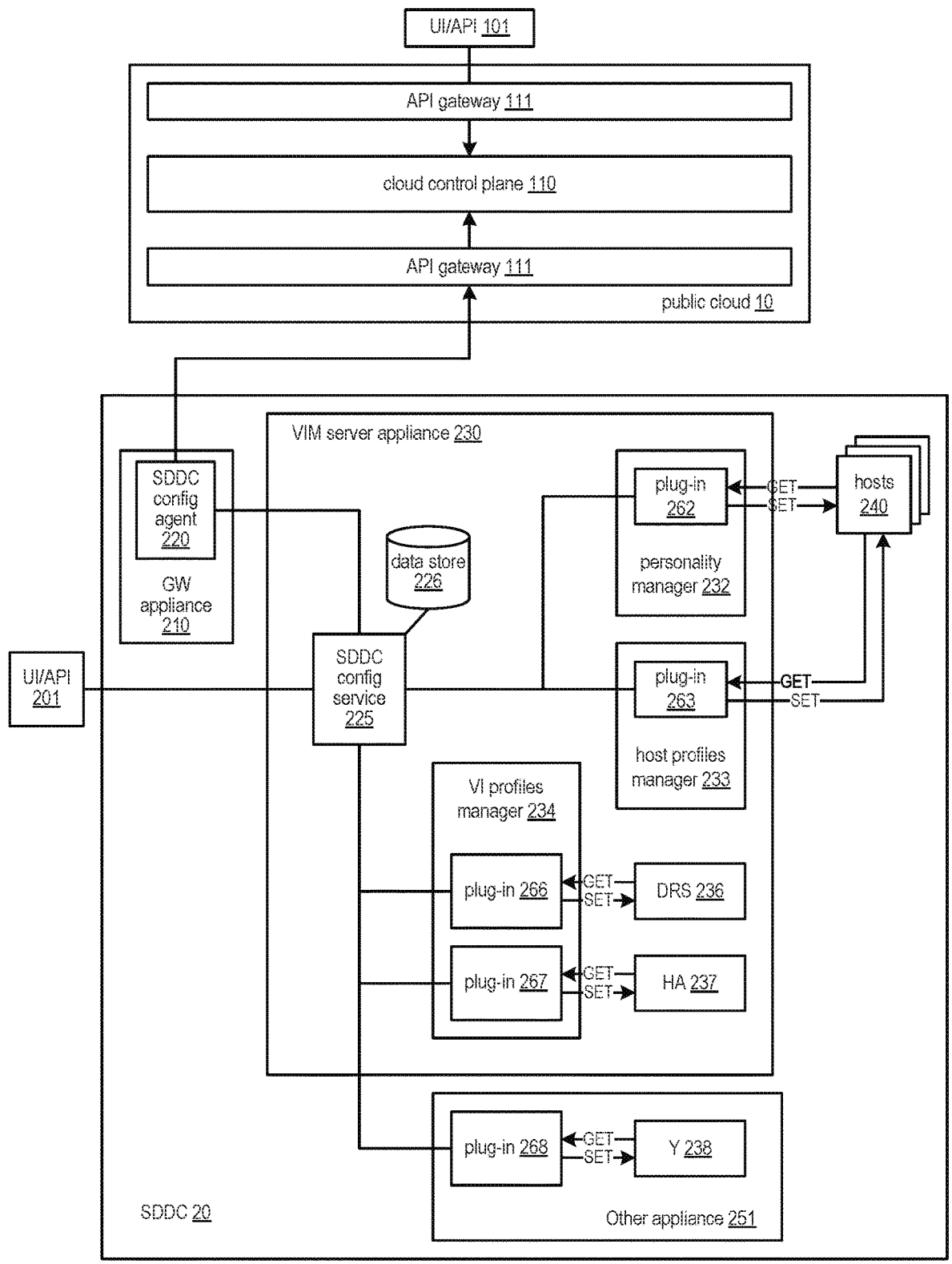
FIG. 5 depicts a plurality of SDDCs that are managed through the cloud control plane in additional detail.

FIG. 5 depicts a plurality of SDDCs that are managed through cloud control plane 110 in additional detail. A plurality of service plug-ins is depicted in FIG. 5 and these service plug-ins are responsible for acquiring the current configurations of SDDC 20 through the GET command and for applying the configurations specified in the desired state document through the SET command. The service plug-ins depicted in FIG. 5 include plug-in 262 of personality manager 232, plug-in 263 of host profiles manager 233, plug-in 266 for DRS 236, plug-in 267 for HA 237, and plug-in 268 for software product Y 238 installed in other appliance 251 (e.g., network virtualization software product installed in a virtual network management server).

It should be understood that the software products/services and the corresponding service plug-ins depicted in FIG. 5 are merely representative of the software products/services that may be deployed in actual deployments of SDDC 20, and thus the actual implementations may employ more software products/services and corresponding service plug-ins and different software products/services and corresponding service plug-ins.

Figure 6:
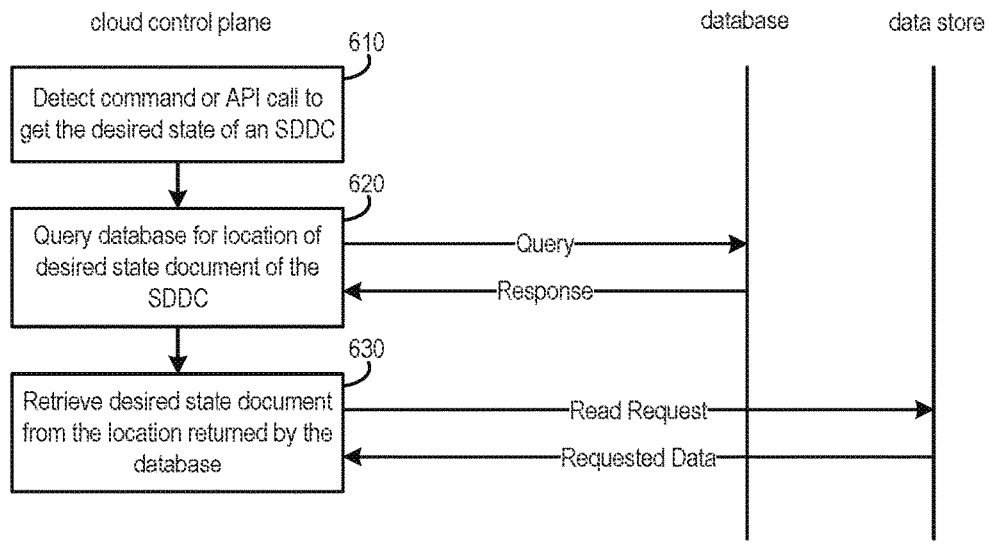
FIG. 6 depicts a sequence of steps carried out by the cloud control plane to get the desired state of any of the SDDCs.

FIG. 6 depicts a sequence of steps carried out by cloud control plane 110 to get the desired state of any of SDDCs 20. The steps of FIG. 6 are triggered by a direct command entered by the administrator through UI/API 101 or an API call made through UI/API 101, which specifies the SDDC whose desired state is to be retrieved (hereinafter referred to as "target SDDC") (step 610). In response to the direct command or API call, SDDC configuration interface endpoint service 120 queries the desired state tracking database at step 620 for the location of the desired state document of the target SDDC. Then, at step 630, SDDC configuration interface endpoint service 120 retrieves the desired state document from data store 165 using the location of the desired state document of the target SDDC returned by the desired state tracking database.

Figure 7:
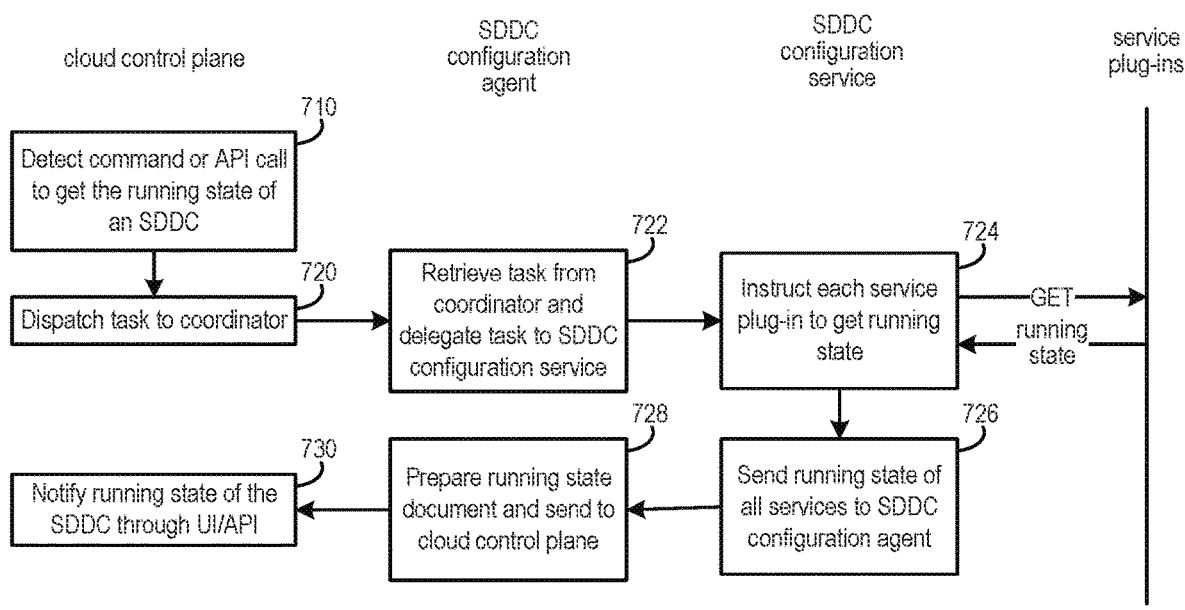
FIG. 7 depicts a sequence of steps carried out by cloud control plane, SDDC configuration agent, and the local control plane to get the running state of an SDDC.

FIG. 7 depicts a sequence of steps carried out by cloud control plane 110, SDDC configuration agent 220, and the local control plane to get the running state of any of SDDCs 20. The steps of FIG. 7 are triggered by a direct command entered by the administrator through UI/API 101 or an API call made through UI/API 101, which specifies the SDDC whose running state is to be retrieved (hereinafter referred to as "target SDDC") (step 710). In response to the direct command or API call, SDDC configuration interface endpoint service 120 stores the operation requested in the direct command or API call in activity service 130. This operation is passed onto SDDC task dispatcher service 141 by SDDC configuration worker service 140, and SDDC task dispatcher service 141 in turn dispatches the task to get the running state of the target SDDC, to coordinator 150 (step 720).

At step 722, SDDC configuration agent 220 running in the target SDDC retrieves the dispatched task from coordinator 150 and delegates the task to SDDC configuration service 225. Then, SDDC configuration service 225 at step 724 instructs each of the service plug-ins to get the running state from its associated software products/services, and at step 726 sends the running state returned by the service plug-ins to SDDC configuration agent 220. At step 728, SDDC configuration agent 220 prepares the running state document and sends it to cloud control plane 110, which at step 730 notifies the administrator or the API caller of the running state through notification service 170.

Figure 8:
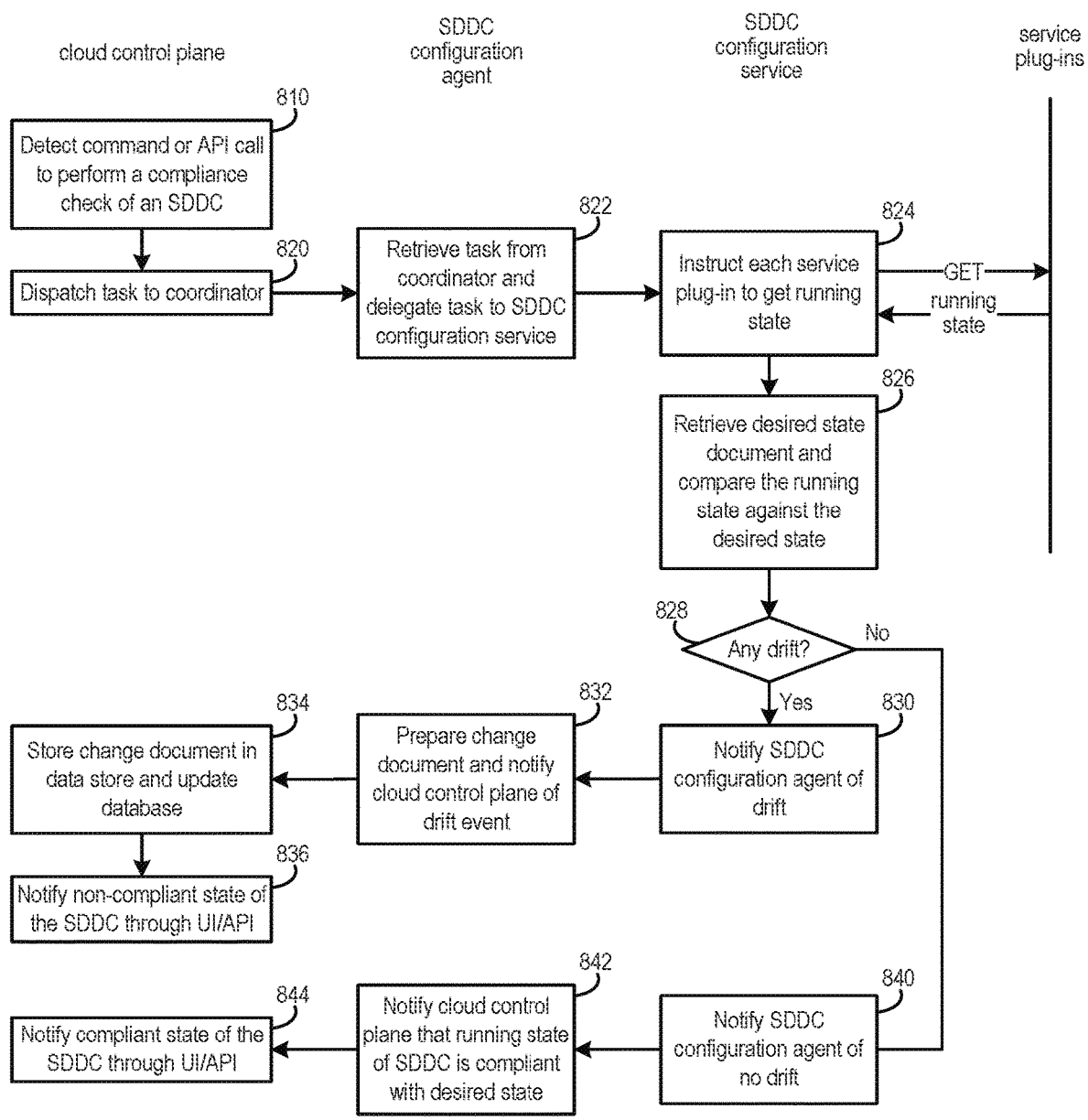
FIG. 8 depicts a sequence of steps carried out by cloud control plane, SDDC configuration agent, and the local control plane to perform a compliance check of an SDDC against the desired state.

FIG. 8 depicts a sequence of steps carried out by cloud control plane 110, SDDC configuration agent 220, and the local control plane to perform a compliance check of an SDDC against the desired state. The steps of FIG. 8 are triggered by a direct command entered by the administrator through UI/API 101 or an API call made through UI/API 101, which specifies the SDDC on which the compliance check is performed (hereinafter referred to as "target SDDC") (step 810). In response to the direct command or API call, SDDC configuration interface endpoint service 120 stores the operation requested in the direct command or API call in activity service 130. This operation is passed onto SDDC task dispatcher service 141 by SDDC configuration worker service 140, and SDDC task dispatcher service 141 in turn dispatches the task to perform the compliance check on the target SDDC, to coordinator 150 (step 820).

At step 822, SDDC configuration agent 220 running in the target SDDC retrieves the dispatched task from coordinator 150 and delegates the task to SDDC configuration service 225. Then, SDDC configuration service 225 at step 824 instructs each of the service plug-ins to get the running state from its associated software products/services, and at step 826 retrieves the desired state document of the target SDDC stored in data store 226 and compares the running state against the desired state specified in the desired state document.

If, as a result of the comparison, SDDC configuration service 225 detects drift of the running state from the desired state (step 828, Yes), SDDC configuration service 225 at step 830 notifies SDDC configuration agent 220 of the drift. Then, at step 832, SDDC configuration agent 220 prepares the change document and sends a notification of the drift event to cloud control plane 110 along with the change document. The drift event is processed in cloud control plane 110 as described above, whereby SDDC profile manager service 160 stores the change document in data store 165 and updates the desired state tracking database (step 834). Then, at step 836, the administrator or the API caller is notified of the drift through notification service 170.

If, as a result of the comparison, SDDC configuration service 225 does not detect any drift of the running state from the desired state (step 828, No), SDDC configuration service 225 at step 840 notifies SDDC configuration agent 220 that there is no drift. Then, at step 842, SDDC configuration agent 220 notifies cloud control plane 110 that the target SDDC is compliant with the desired state, and at step 844, the administrator or the API caller is notified of the compliant state of the target SDDC through notification service 170.

The compliance check described above may be carried out for all SDDCs of a tenant. In such a case, SDDC configuration interface endpoint service 120 queries the desired state tracking database for the SDDCs of the tenant, and creates children activities, one for each SDDC of the tenant. The children activities are stored in activity service 130 and specify the compliance check operation to be carried out in the respective SDDCs of the tenant.

Figure 9:
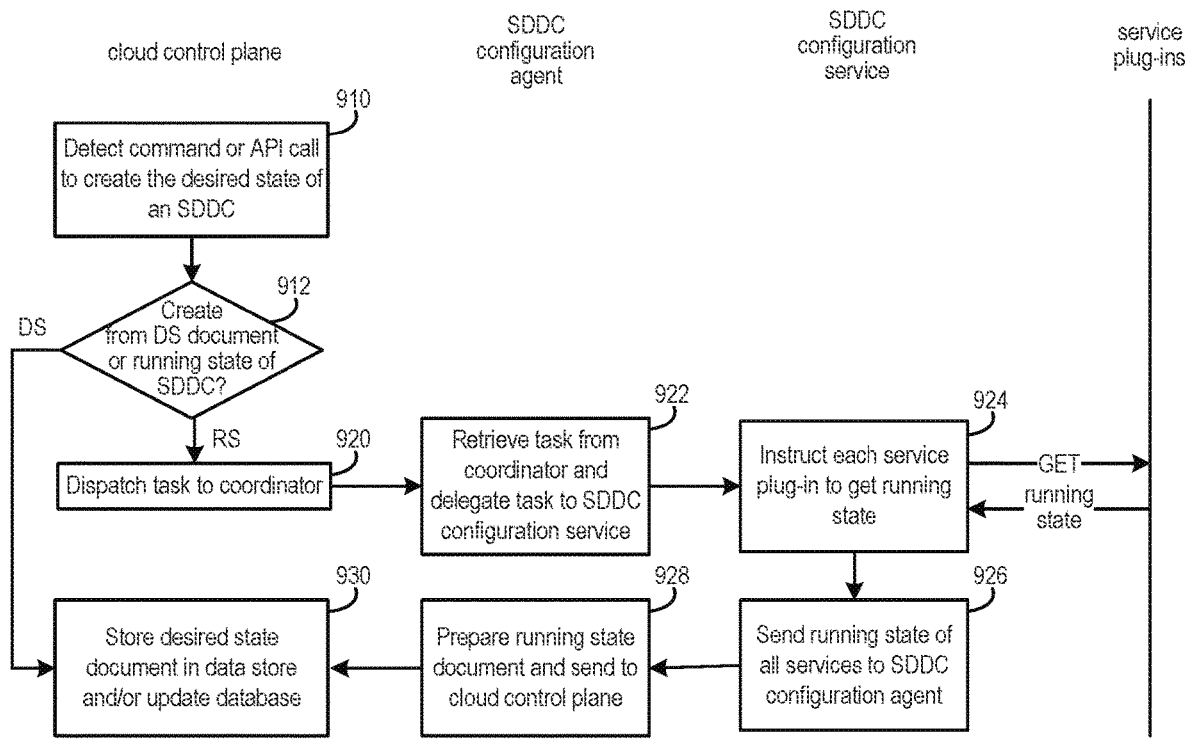
FIG. 9 depicts a sequence of steps carried out by cloud control plane, SDDC configuration agent, and the local control plane to create the desired state of any of SDDCs.

FIG. 9 depicts a sequence of steps carried out by cloud control plane 110, SDDC configuration agent 220, and the local control plane to create the desired state of any of SDDCs 20. The steps of FIG. 9 are triggered by a direct command entered by the administrator through UI/API 101 or an API call made through UI/API 101, which specifies the SDDC whose desired state is being defined (hereinafter referred to as "target SDDC") (step 910). The direct command or API call may specify a location of the desired state document in data store 165 (in which case the desired state is to be created from a desired state document) or specify another SDDC (hereinafter referred to as "reference SDDC") (in which case the desired state is to be created from the running state of the reference SDDC). If the desired state is to be created from the running state of the reference SDDC (step 912, RS), SDDC configuration interface endpoint service 120 stores the operation to get the running state of the reference SDDC in activity service 130. This operation is passed onto SDDC task dispatcher service 141 by SDDC configuration worker service 140, and SDDC task dispatcher service 141 in turn dispatches the task to get the running state of the reference SDDC, to coordinator 150 (step 920).

At step 922, SDDC configuration agent 220 running in the reference SDDC retrieves the dispatched task from coordinator 150 and delegates the task to SDDC configuration service 225. Then, SDDC configuration service 225 at step 924 instructs each of the service plug-ins to get the running state from its associated software products/services, and at step 926 sends the running state returned by the service plug-ins to SDDC configuration agent 220. At step 928, SDDC configuration agent 220 prepares the running state document and sends it to cloud control plane 110. At step 930, SDDC profile manager service 160 stores the running state document in data store 165 and updates the desired state tracking database to identify the running state document as the desired state statement of the target SDDC and to record the time of this update.

Returning to step 912, if the desired state is to be created from a desired state document (step 912, DS), SDDC profile manager service 160 at step 930 updates the desired state tracking database to associate the desired state document with the target SDDC and to record the time of this update.

Figure 10:
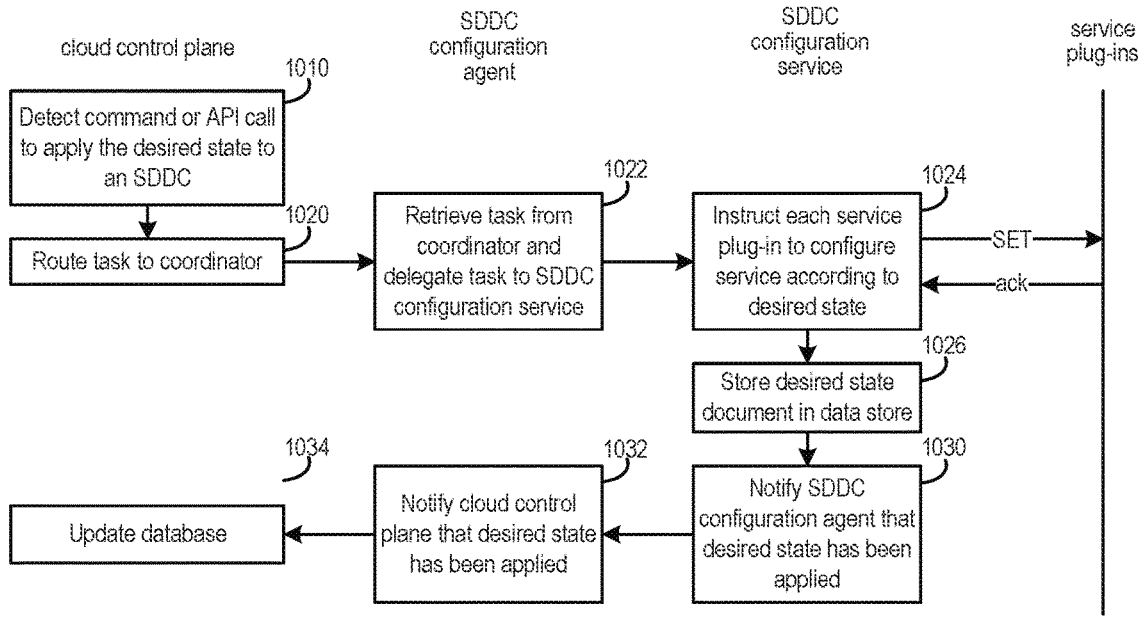
FIG. 10 depicts a sequence of steps carried out by cloud control plane, SDDC configuration agent, and the local control plane to apply the desired state to an SDDC.

FIG. 10 depicts a sequence of steps carried out by cloud control plane 110, SDDC configuration agent 220, and the local control plane to apply the desired state to an SDDC. The steps of FIG. 10 are triggered by a direct command entered by the administrator through UI/API 101 or an API call made through UI/API 101, which specifies the SDDC on which the apply operation is performed (hereinafter referred to as "target SDDC") and the desired state document to apply (step 1010). In response to the direct command or API call, SDDC configuration interface endpoint service 120 stores the operation requested in the direct command or API call in activity service 130 along with the desired state document SDDC configuration interface endpoint service 120 retrieves from data store 165. This operation and the desired state document are passed onto SDDC task dispatcher service 141 by SDDC configuration worker service 140, and SDDC task dispatcher service 141 in turn dispatches the task to perform the apply operation on the target SDDC along with the desired state document, to coordinator 150 (step 1020).

At step 1022, SDDC configuration agent 220 running in the target SDDC retrieves the dispatched task and the desired state document from coordinator 150 and delegates the task to SDDC configuration service 225. Then, SDDC configuration service 225 at step 1024 instructs each of the service plug-ins to set its associated software products/services to the desired state specified in the desired state document, and at step 1026 stores the desired state document in data store 226.

SDDC configuration service 225 at step 1030 notifies SDDC configuration agent 220 that the desired state has been applied, and SDDC configuration agent 220 at step 1032 notifies cloud control plane 110 that the desired state has been applied to the target SDDC. Then, at step 1034, SDDC profile manager service 160 updates the desired state tracking database to record the association of the desired state document with the target SDDC and the time of this update.

The application of the desired state described above may be carried out for all SDDCs of a tenant. In such a case, SDDC configuration interface endpoint service 120 queries the desired state tracking database for the SDDCs of the tenant, and creates children activities, one for each SDDC of the tenant. The children activities are stored in activity service 130 and specify the apply operation to be carried out in the respective SDDCs of the tenant.

In some embodiments, the compliance check described above is carried out on a periodic basis by each of the SDDCs and cloud control plane 110 is notified of any drift event in the SDDCs, and the apply operation described above is carried out automatically in response to any such drift event to remediate the running state of the SDDCs to conform to the desired state.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing configurations of a plurality of data centers according to instructions from a cloud control plane and according to a desired state of the configurations, said method comprising the following steps carried out in each of the data centers:
    retrieving a running state of the configurations and notifying the cloud control plane of the running state of the configurations;
    comparing the running state against a first desired state of the configurations specified in a first desired state document, determining a drift of the running state from the first desired state, and notifying the cloud control plane of the drift; and
    accessing a second desired state document that specifies a second desired state of the configurations and applying the second desired state of the configuration, wherein the second desired state is different from the first desired state.

2. The method of claim 1, wherein each of the data centers is a software-defined data center that is managed by one or more management servers including a virtual infrastructure management server.

3. The method of claim 2, wherein the configurations include configurations of software components running in the virtual infrastructure management server.

4. The method of claim 3, wherein
each of the software components has a corresponding plug-in and is configured by issuing a set command to the corresponding plug-in, and
the running state is retrieved by issuing a get command to each of the plug-ins of the software components.

5. The method of claim 2, wherein the one or more management servers further include a virtual network management server and the configurations further include configurations of software components running in the virtual network management server.

6. The method of claim 1, wherein the cloud control plane is notified through a configuration agent running in a gateway appliance and the instructions issued by the cloud control plane are received through the configuration agent.

7. The method of claim 6, wherein the second desired state document is retrieved by the configuration agent from a location specified in an instruction to apply the desired state issued by the cloud control plane.

8. A non-transitory computer readable medium comprising instructions to be executed in a computer system located in one of a plurality of data centers to carry out a method of managing configurations of the plurality of data centers according to instructions from a cloud control plane and according to a desired state of the configurations, said method comprising:
retrieving a running state of the configurations and notifying the cloud control plane of the running state of the configurations;
comparing the running state against a first desired state of the configurations specified in a first desired state document, determining a drift of the running state from the first desired state, and notifying the cloud control plane of the drift; and
accessing a second desired state document that specifies a second desired state of the configurations and applying the second desired state of the configuration, wherein the second desired state is different from the first desired state.

9. The non-transitory computer readable medium of claim 8, wherein each of the data centers is a software-defined data center that is managed by one or more management servers including a virtual infrastructure management server.

10. The non-transitory computer readable medium of claim 9, wherein the configurations include configurations of software components running in the virtual infrastructure management server.

11. The non-transitory computer readable medium of claim 10, wherein
each of the software components has a corresponding plug-in and is configured by issuing a set command to the corresponding plug-in, and
the running state is retrieved by issuing a get command to each of the plug-ins of the software components.

12. The non-transitory computer readable medium of claim 9, wherein the one or more management servers further include a virtual network management server and the configurations further include configurations of software components running in the virtual network management server.

13. The non-transitory computer readable medium of claim 8, wherein the cloud control plane is notified through a configuration agent running in a gateway appliance and the instructions issued by the cloud control plane are received through the configuration agent.

14. The non-transitory computer readable medium of claim 13, wherein the second desired state document is retrieved by the configuration agent from a location specified in an instruction to apply the desired state issued by the cloud control plane.

15. A virtual infrastructure management server located in one of a plurality of software-defined data centers to carry out a method of managing configurations of the plurality of software-defined data centers according to instructions from a cloud control plane and according to a desired state of the configurations, wherein the virtual infrastructure management server includes a processor that is programmed to carry out the steps of:
retrieving a running state of the configurations and notifying the cloud control plane of the running state of the configurations;
comparing the running state against a first desired state of the configurations specified in a first desired state document, determining a drift of the running state from the first desired state, and notifying the cloud control plane of the drift; and
accessing a second desired state document that specifies a second desired state of the configurations and applying the second desired state of the configuration, wherein the second desired state is different from the first desired state.

16. The virtual infrastructure management server of claim 15, wherein the configurations include configurations of software components running in the virtual infrastructure management server.

17. The virtual infrastructure management server of claim 16, wherein
the configuration further include configurations of a cluster of host computers from which the software-defined data center is provisioned and the software components include a configuration manager of the host computers.

18. The virtual infrastructure management server of claim 16, wherein
each of the software components has a corresponding plug-in and is configured by issuing a set command to the corresponding plug-in, and
the running state is retrieved by issuing a get command to each of the plug-ins of the software components.

19. The virtual infrastructure management server of claim 15, wherein the cloud control plane is notified through a configuration agent running in a gateway appliance and the instructions issued by the cloud control plane are received through the configuration agent.

20. The virtual infrastructure management server of claim 19, wherein the second desired state document is retrieved by the configuration agent from a location specified in an instruction to apply the desired state issued by the cloud control plane.

* * * * *